(12) United States Patent
Cooper

(10) Patent No.: US 6,303,074 B1
(45) Date of Patent: Oct. 16, 2001

(54) MIXED FLOW ROTOR FOR MOLTEN METAL PUMPING DEVICE

(76) Inventor: Paul V. Cooper, 11247 Lake Forest Dr., Chesterland, OH (US) 44026

(*) Notice: Subject to any disclaimer, the term of this patent is extended or adjusted under 35 U.S.C. 154(b) by 0 days.

(21) Appl. No.: 09/312,361

(22) Filed: May 14, 1999

(51) Int. Cl.⁷ .................................................. C21B 3/04
(52) U.S. Cl. .......................... 266/235; 266/233; 415/200
(58) Field of Search ................................... 266/216, 233, 266/235, 901; 415/200

(56) References Cited

U.S. PATENT DOCUMENTS

| | | |
|---|---|---|
| 209,219 | 10/1878 | Bookwalter . |
| 251,104 | 12/1881 | Finch . |
| 364,804 | 6/1887 | Cole . |
| 506,572 | 10/1893 | Wagener . |
| 585,188 | 6/1897 | Davis . |
| 898,499 | 9/1908 | O'Donnell . |
| 1,100,475 | 6/1914 | Franckaerts . |
| 1,331,997 | 2/1920 | Neal . |
| 1,454,967 | 5/1923 | Gill . |
| 1,518,501 | 12/1924 | Gill . |
| 1,522,765 | 1/1925 | Wilke . |
| 1,526,851 | 2/1925 | Hall . |
| 1,669,668 | 5/1928 | Marshall . |
| 1,673,594 | 6/1928 | Schmidt . |
| 1,717,969 | 6/1929 | Goodner . |
| 1,896,201 | 2/1933 | Sterner-Rainer . |
| 2,038,221 | 4/1936 | Kagi . |
| 2,290,961 | 7/1942 | Heuer . |
| 2,488,447 | 11/1949 | Tangen et al. . |
| 2,515,478 | 7/1950 | Tooley et al. . |
| 2,528,210 | 10/1950 | Pump . |
| 2,566,892 | 9/1951 | Jacobs . |
| 2,677,609 | 5/1954 | Moore et al. . |
| 2,698,583 | 1/1955 | House et al. . |
| 2,787,873 | 4/1957 | Hadley . |
| 2,808,782 | 10/1957 | Thompson et al. . |
| 2,821,472 | 1/1958 | Peterson et al. . |
| 2,832,292 | 4/1958 | Edwards . |

(List continued on next page.)

FOREIGN PATENT DOCUMENTS

| | | |
|---|---|---|
| 683469 | 3/1964 | (CA) . |
| 392268 | 9/1965 | (CH) . |
| 1800446 | 11/1969 | (DE) . |
| 0665378 | 2/1995 | (EP) . |
| 942648 | 11/1963 | (GB) . |
| 1185314 | 3/1970 | (GB) . |
| 2217784 | 11/1989 | (GB) . |
| 58-48796 | 3/1983 | (JP) . |
| 63-104773 | 5/1998 | (JP) . |
| 90756 | 1/1958 | (NO) . |
| 416401 | 6/1974 | (RU) . |
| 773312 | 10/1980 | (RU) . |
| 98205031 | 11/1998 | (WO) . |

OTHER PUBLICATIONS

Declaration of Paul V. Cooper, dated Apr. 7, 1998.
Lobanoff, et al. "Centrifugal Pumps Design & Application" Second Edition, pp. 173–236 Dec. 1992.

*Primary Examiner*—Scott Kastler
(74) *Attorney, Agent, or Firm*—David E. Rogers; Stuart A. Whittington; Squire, Sanders & Dempsey L.L.P.

(57) ABSTRACT

A molten metal pumping device is disclosed that comprises a pump base including at least one input port, a pump chamber, a chamber wall, and a discharge leading to an output port. A rotor is retained within the chamber and is connected to a rotor shaft. The device further includes a superstructure attached to and positioned above the pump housing, a motor on the superstructure, a drive shaft connected to the motor and a coupling connecting the drive shaft to the rotor shaft. The rotor is a dual-flow (or mixed-flow) rotor, directing molten metal both into the chamber and towards the chamber wall, where it ultimately exits the chamber through the discharge. The dual-flow rotor can also be used with a scrap melter.

32 Claims, 10 Drawing Sheets

U.S. PATENT DOCUMENTS

| | | |
|---|---|---|
| 2,865,618 | 12/1958 | Abell . |
| 2,901,677 | 8/1959 | Chessman et al. . |
| 2,948,524 | 8/1960 | Sweeney et al. . |
| 2,978,885 | 4/1961 | Davison . |
| 2,984,524 | 5/1961 | Franzen . |
| 2,987,885 | 6/1961 | Hodge . |
| 3,010,402 | 11/1961 | King . |
| 3,048,384 | 8/1962 | Sweeney et al. . |
| 3,070,393 | 12/1962 | Silverberg et al. . |
| 3,092,030 | 6/1963 | Wunder . |
| 3,227,547 | 1/1966 | Szekely . |
| 3,244,109 | 4/1966 | Barske . |
| 3,251,676 | 5/1966 | Johnson . |
| 3,255,702 | 6/1966 | Gehrm . |
| 3,272,619 | 9/1966 | Sweeney et al. . |
| 3,289,473 | 12/1966 | Louda . |
| 3,291,473 | 12/1966 | Sweeney et al. . |
| 3,400,923 | 9/1968 | Howie et al. . |
| 3,417,929 | 12/1968 | Secrest . |
| 3,459,133 | 8/1969 | Scheffler . |
| 3,459,346 | 8/1969 | Tinnes . |
| 3,487,805 | 1/1970 | Satterthwaite . |
| 3,512,762 | 5/1970 | Umbricht . |
| 3,512,788 | 5/1970 | Kilbane . |
| 3,575,525 | 4/1971 | Fox et al. . |
| 3,618,917 | 11/1971 | Fredrikson . |
| 3,650,730 | 3/1972 | Derham et al. . |
| 3,689,048 | 9/1972 | Foulard et al. . |
| 3,715,112 | 2/1973 | Carbonnel . |
| 3,743,263 | 7/1973 | Szekely . |
| 3,743,500 | 7/1973 | Foulard et al. . |
| 3,753,690 | 8/1973 | Emley et al. . |
| 3,759,635 | 9/1973 | Carter et al. . |
| 3,767,382 | 10/1973 | Bruno et al. . |
| 3,776,660 | 12/1973 | Anderson et al. . |
| 3,785,632 | 1/1974 | Kraemer et al. . |
| 3,814,400 | 6/1974 | Seki . |
| 3,824,042 | 7/1974 | Barnes et al. . |
| 3,836,280 | 9/1974 | Koch . |
| 3,839,019 | 10/1974 | Bruno et al. . |
| 3,871,872 | 3/1975 | Downing et al. . |
| 3,873,305 | 3/1975 | Claxton et al. . |
| 3,886,992 | 6/1975 | Maas et al. . |
| 3,915,694 | 10/1975 | Ando . |
| 3,954,134 | 5/1976 | Maas et al. . |
| 3,961,778 | 6/1976 | Carbonnel et al. . |
| 3,972,709 | 8/1976 | Chin et al. . |
| 3,984,234 | 10/1976 | Claxton et al. . |
| 3,985,000 | 10/1976 | Hartz . |
| 3,997,336 | 12/1976 | van Linden et al. . |
| 4,003,560 | 1/1977 | Carbonnel . |
| 4,018,598 | 4/1977 | Markus . |
| 4,052,199 | 10/1977 | Mangalick . |
| 4,091,970 | 5/1978 | Komiyama et al. . |
| 4,126,360 | 11/1978 | Miller et al. . |
| 4,128,415 | 12/1978 | van Linden et al. . |
| 4,169,584 | 10/1979 | Mangalick . |
| 4,286,985 | 9/1981 | van Linden et al. . |
| 4,322,245 | 3/1982 | Claxton . |
| 4,351,514 | 9/1982 | Koch . |
| 4,360,314 | 11/1982 | Pennell . |
| 4,370,096 | 1/1983 | Church . |
| 4,372,541 | 2/1983 | Bocourt et al. . |
| 4,392,888 | 7/1983 | Eckert et al. . |
| 4,410,299 | 10/1983 | Shimoyama . |
| 4,456,424 | 6/1984 | Araoka . |
| 4,504,392 | 3/1985 | Groteke . |
| 4,537,624 | 8/1985 | Tenhover et al. . |
| 4,537,625 | 8/1985 | Tenhover et al. . |
| 4,556,419 | 12/1985 | Otsuka et al. . |
| 4,557,766 | 12/1985 | Tenhover et al. . |
| 4,586,845 | 5/1986 | Morris . |
| 4,598,899 | 7/1986 | Cooper . |
| 4,600,222 | 7/1986 | Appling . |
| 4,609,442 | 9/1986 | Tenhover et al. . |
| 4,611,790 | 9/1986 | Otsuka et al. . |
| 4,634,105 | 1/1987 | Withers et al. . |
| 4,640,666 | 2/1987 | Sodergard . |
| 4,696,703 | 9/1987 | Henderson et al. . |
| 4,701,226 | 10/1987 | Henderson et al. . |
| 4,714,371 | 12/1987 | Cuse . |
| 4,717,540 | 1/1988 | McRae et al. . |
| 4,743,428 | 5/1988 | McRae et al. . |
| 4,770,701 | 9/1988 | Henderson et al. . |
| 4,786,230 | 11/1988 | Thut . |
| 4,802,656 | 2/1989 | Hudault et al. . |
| 4,804,168 | 2/1989 | Otsuka et al. . |
| 4,810,314 | 3/1989 | Henderson et al. . |
| 4,834,573 | 5/1989 | Asano et al. . |
| 4,842,227 | 6/1989 | Harrington et al. . |
| 4,844,425 | 7/1989 | Piras et al. . |
| 4,851,296 | 7/1989 | Tenhover et al. . |
| 4,859,413 | 8/1989 | Harris et al. . |
| 4,867,638 | 9/1989 | Handtmann et al. . |
| 4,884,786 | 12/1989 | Gillespie . |
| 4,898,367 | 2/1990 | Cooper . |
| 4,923,770 | 5/1990 | Grasselli et al. . |
| 4,930,986 | 6/1990 | Cooper . |
| 4,931,091 | 6/1990 | Waite et al. . |
| 4,940,214 | 7/1990 | Gillespie . |
| 4,940,384 | 7/1990 | Amra et al. . |
| 4,954,167 | 9/1990 | Cooper . |
| 4,973,433 | 11/1990 | Gilbert et al. . |
| 4,989,736 | 2/1991 | Andersson et al. . |
| 5,028,211 | 7/1991 | Mordue et al. . |
| 5,078,572 | 1/1992 | Amra et al. . |
| 5,088,893 | 2/1992 | Gilbert et al. . |
| 5,092,821 | 3/1992 | Gilbert et al. . |
| 5,098,134 | 3/1992 | Monckton . |
| 5,131,632 | 7/1992 | Olson . |
| 5,143,357 | 9/1992 | Gilbert et al. . |
| 5,145,322 | 9/1992 | Senior et al. . |
| 5,162,858 | 11/1992 | Shoji et al. . |
| 5,165,858 | 11/1992 | Gilbert et al. . |
| 5,203,681 | 4/1993 | Cooper . |
| 5,209,641 | 5/1993 | Hoglund et al. . |
| 5,268,020 | * 12/1993 | Claxton .............................. 266/235 |
| 5,286,163 | 2/1994 | Amra et al. . |
| 5,308,045 | 5/1994 | Cooper . |
| 5,310,412 | 5/1994 | Gilbert et al. . |
| 5,318,360 | 6/1994 | Langer et al. . |
| 5,330,328 | 7/1994 | Cooper . |
| 5,364,078 | 11/1994 | Pelton . |
| 5,388,633 | 2/1995 | Mercer, II et al. . |
| 5,399,074 | 3/1995 | Nose et al. . |
| 5,407,294 | 4/1995 | Giannini . |
| 5,431,551 | 7/1995 | Aquino et al. . |
| 5,454,423 | 10/1995 | Tsuchida et al. . |
| 5,468,280 | 11/1995 | Areaux . |
| 5,470,201 | 11/1995 | Gilbert et al. . |
| 5,484,265 | 1/1996 | Horvath et al. . |
| 5,495,746 | 3/1996 | Sigworth . |
| 5,509,791 | 4/1996 | Turner . |
| 5,558,501 | 9/1996 | Wang et al. . |
| 5,558,505 | 9/1996 | Mordue et al. . |
| 5,586,863 | 12/1996 | Gilbert et al. . |
| 5,597,289 | 1/1997 | Thut . |
| 5,622,481 | 4/1997 | Thut . |
| 5,634,770 | 6/1997 | Gilbert et al. . |
| 5,655,849 | 8/1997 | McEwen et al. . |
| 5,662,725 | 9/1997 | Cooper . |

| | | |
|---|---|---|
| 5,678,807 | 10/1997 | Cooper . |
| 5,685,701 | 11/1997 | Chandler et al. . |
| 5,716,195 | 2/1998 | Thut . |
| 5,735,668 | 4/1998 | Klein . |
| 5,735,935 | 4/1998 | Areaux . |
| 5,741,422 | 4/1998 | Eichenmiller et al. . |
| 5,772,324 | 6/1998 | Falk . |
| 5,785,494 | 7/1998 | Vild et al. . |
| 5,842,832 * | 12/1998 | Thut ..................................... 266/235 |
| 5,944,496 | 8/1999 | Cooper . |
| 5,947,705 | 9/1999 | Mordue et al. . |
| 5,993,726 | 11/1999 | Huang et al. . |
| 5,993,728 | 11/1999 | Vild . |
| 6,036,745 | 3/2000 | Gilbert et al. . |
| 6,074,455 | 6/2000 | van Linden et al. . |

* cited by examiner

MIXED FLOW ROTOR FOR MOLTEN METAL PUMPING DEVICE

FIELD OF THE INVENTION

The present invention relates to a device for pumping molten metal wherein the device includes a rotor that directs flow both into and out of a pump chamber.

BACKGROUND OF THE INVENTION

Devices for pumping molten metal (referred to herein as pumps, molten metal pumps or molten metal pumping devices), particularly molten aluminum, and various components that can be used with these devices are generally disclosed in U.S. Pat. No. 2,948,524 to Sweeney et al., U.S. Pat. No. 5,203,681 to Cooper entitled "Submersible Molten Metal Pump," pending U.S. application Ser. No. 08/759,780, filed Dec. 13, 1996, entitled Molten Metal Pump With A Flexible Coupling and Cement-Free Metal-Transfer Conduit Connection, U.S. application Ser. No. 08/889,882, filed Jul. 3, 1997, entitled Rotor Bearing System for Molten Metal Pumps, U.S. application Ser. No. 09/152,168, filed Sep. 11, 1998, entitled Improved Gas Dispersion Device, U.S. Pat. No. 5,678,807 to Cooper and U.S. Pat. No. 5,662,725 to Cooper, the disclosures of which are incorporated herein by reference.

Three basic types of pumps are utilized: circulation pumps, transfer pumps and pumps including gas-release (sometimes referred to as gas-injection) devices. Circulation pumps are used to circulate the molten metal within a bath, thereby equalizing the temperature of the molten metal and creating a uniformly consistent alloy. Most often, as is known by those skilled in the art, circulation pumps are used in conjunction with a reverbatory furnace having an external well. The well is usually an extension of the charging well where scrap metal is charged (i.e., added).

Transfer pumps are generally used to transfer molten metal from the external well of the furnace to a different location such as a ladle or another furnace.

Pumps including gas-release devices circulate the molten metal while adding a gas into the molten metal stream created by the pump in order to "demag" or "degas" the molten metal. In the purification of molten metals, particularly aluminum, it is frequently desired to remove dissolved gases such as hydrogen, or dissolved metals such as magnesium. As is known by those skilled in the art, the removing of dissolved gas is known as "degassing" while the removal of magnesium is known as "demagging."

Known molten-metal pumps include a pump base that comprises a housing, also called a casing, a pump chamber, which is an open area (or cavity) formed within the housing, and a discharge, which is a channel formed within the housing that communicates with the chamber and leads from the chamber to an outlet formed in an exterior wall of the housing. A rotor, also called an impeller, is mounted in the pump chamber and connected to a drive system, which is typically one or more vertical shafts that eventually connect to a motor. As the drive system turns the rotor, the rotor creates a stream of molten metal by pushing molten metal out of the pump chamber, through the discharge, out of the outlet and into the molten metal bath.

When pumping molten metal it is desirable to increase the quantity of metal moved (or pumped) for each revolution of the rotor. Further, it is most desirable to increase the quantity of metal pumped per revolution without increasing the pump's size or energy consumption (or increasing the size and energy consumption by the minimum amount possible). Increasing the amount of molten metal pumped is desirable in any molten metal pumping device because it provides at least the following benefits: (1) in a circulation pump the temperature of the bath is more uniform; (2) in a gas-release pump more molten metal is demagged and/or degassed within a given time frame; and (3) in a transfer pump greater pressure is generated to push the molten metal upward to a higher elevation, if so desired. Alternatively, denser metals, such as zinc, can be pumped through the same transfer pump, having relatively standard pump components and relatively low energy consumption, as is used to pump molten aluminum.

It is also desirable to move more molten metal for each pump revolution because the rotor and pump can operate at a slower speed (i.e., fewer rotor revolutions per minute). This decreases vibration and hence the wear on the pump components, which leads to longer component life and lower maintenance costs.

Several rotors for molten metal pumps are disclosed in the prior art. All are deficient, however, in that they do not solve the above problems in an optimal manner.

SUMMARY OF THE INVENTION

The present invention solves these and other problems by providing a dual-flow (or mixed flow) rotor for a molten metal pumping device wherein the device comprises: (1) a pump housing including a pump chamber and a chamber wall, (2) a discharge leading from the chamber to an outlet that opens into a molten metal bath, (3) a rotor positioned in the chamber, and (4) a drive system for rotating the rotor about an axis. Dual-flow means that the rotor both directs molten metal into the pump chamber and outward toward the chamber wall where it ultimately passes through the discharge. The dual-flow rotor of the present invention preferably has a plurality of vanes wherein each vane comprises: (1) a first surface to direct molten metal into the pump chamber, and (2) a second surface for directing molten metal outward against the chamber wall. Each vane includes a horizontally-oriented projection that includes a leading edge, an upper surface and a lower surface. The first surface is preferably an angled wall formed in the lower surface of the projection near the leading edge. The second surface is preferably a substantially vertical face beneath the projection that directs the molten metal towards the chamber wall. As the rotor rotates, the first surface directs the molten metal into the pump chamber and the second surface directs the molten metal toward the wall of the pump chamber, where the metal eventually moves through the discharge.

Each vane includes a trailing side (opposite the first surface and second surface) that preferably includes a recess. The recess further increases the efficiency of the rotor (and a pump including the rotor) because the recess allows more molten metal to enter the pump chamber.

A rotor of the present invention could also be used with a scrap melter, such as the type described in U.S. Pat. No. 5,308,045 to Cooper, the disclosure of which is incorporated herein by reference. The benefit of the rotor of the present invention, when used with a scrap metal, is that it (1) pushes the molten metal (and hence the scrap) downward into the bath, thereby facilitating the melting of the scrap, and (2) generates a greater flow of molten metal throughout the bath thereby keeping the temperature of the bath consistent, which also facilitates the melting of the scrap.

DETAILED DESCRIPTION OF A PREFERRED EMBODIMENT

Figure 1:
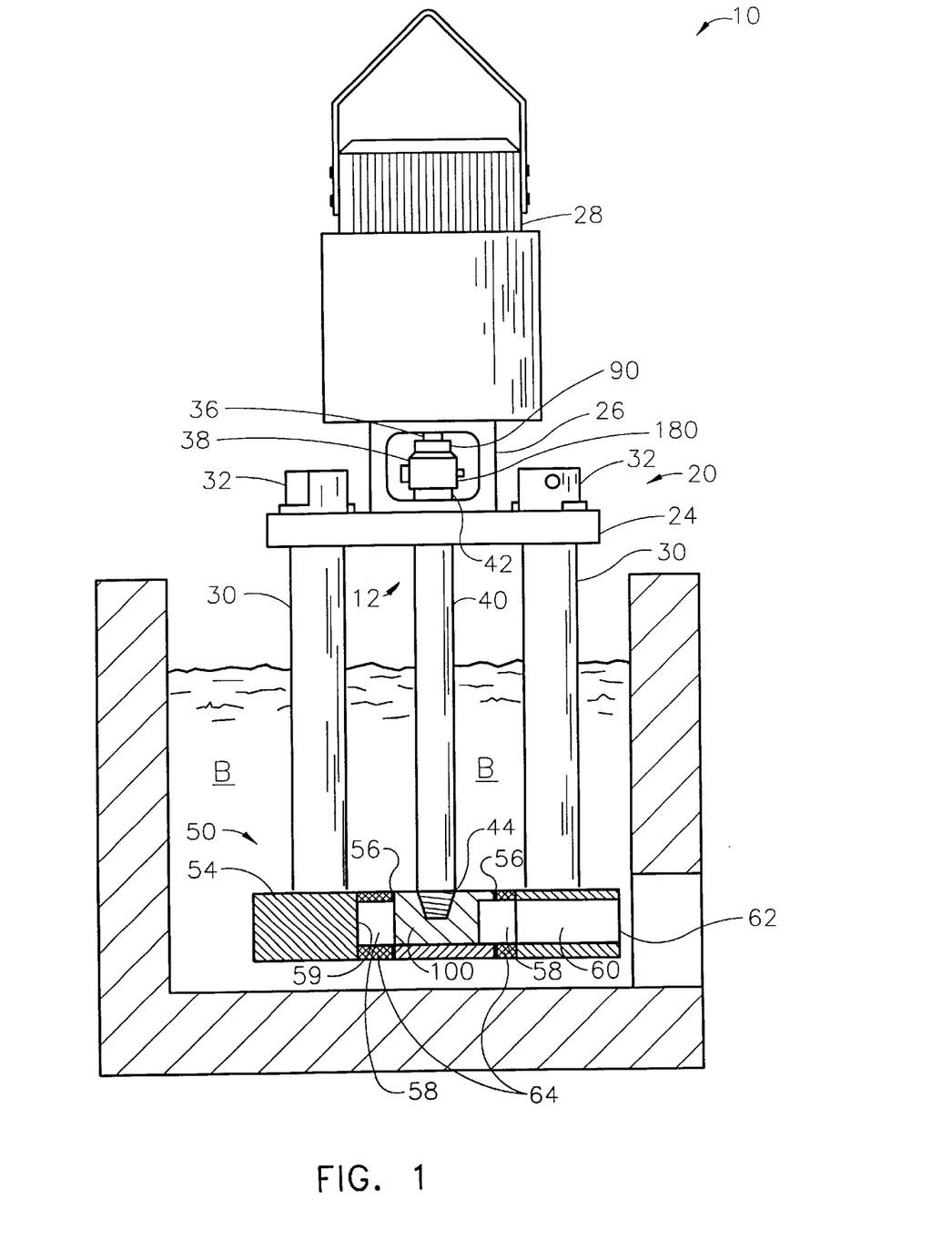
FIG. 1 is a front, partial-sectional view of a molten metal pump in accordance with the invention having a pump discharge formed in the side of the pump housing.
Figure 1A:
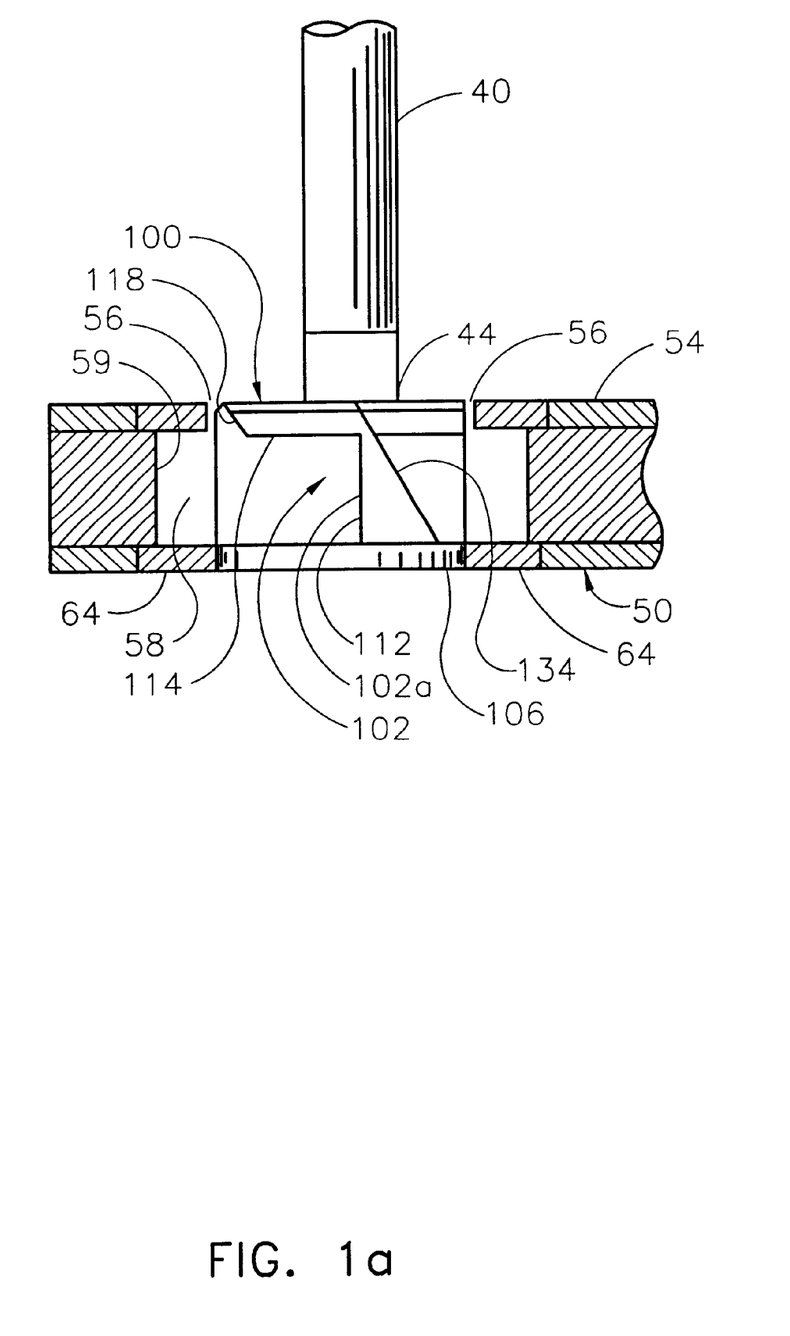
FIG. 1a is a partial, cross-sectional view of the pump chamber shown in FIG. 1 with a rotor therein.
Figure 2:
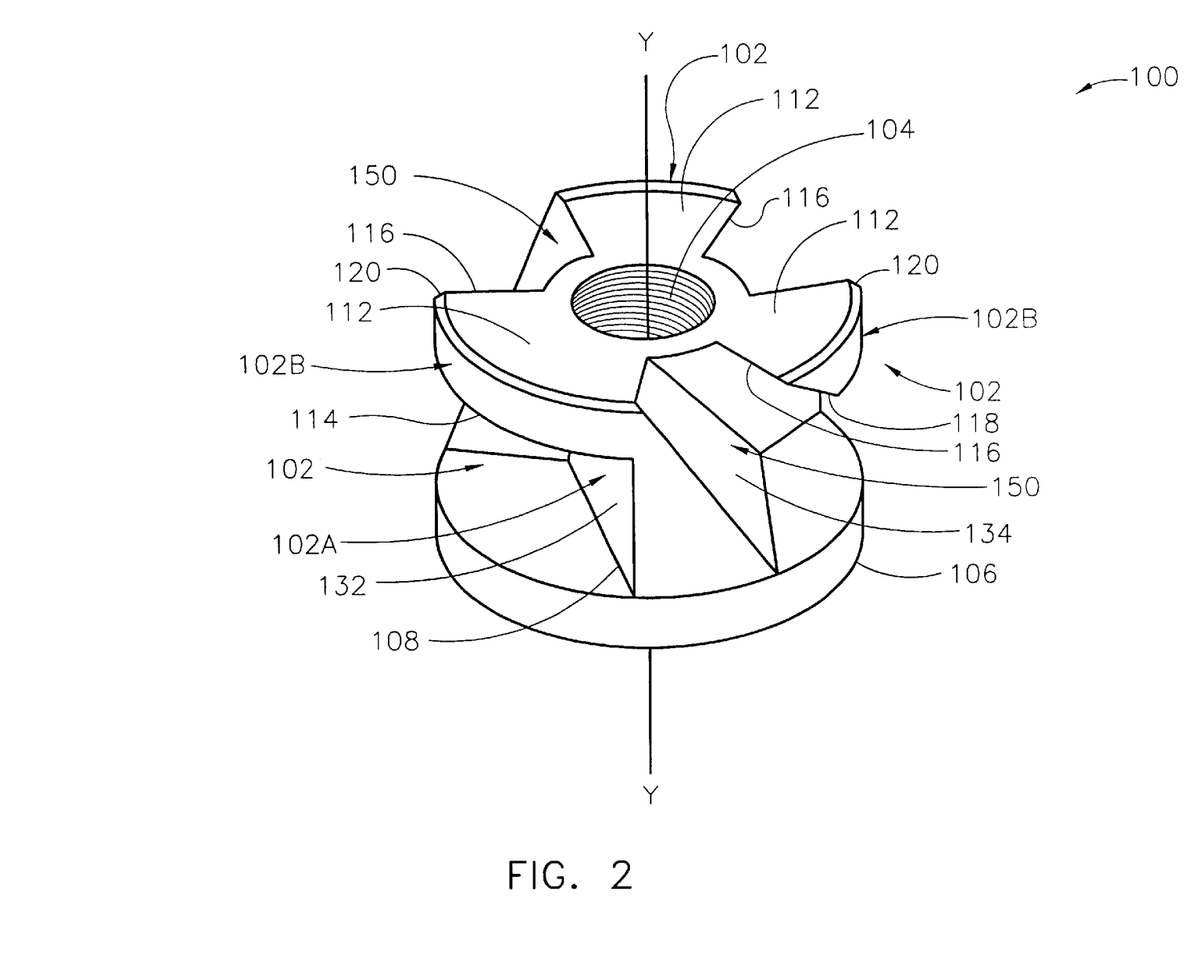
FIG. 2 is a perspective, front view of a rotor in accordance with the present invention.
Figure 3:
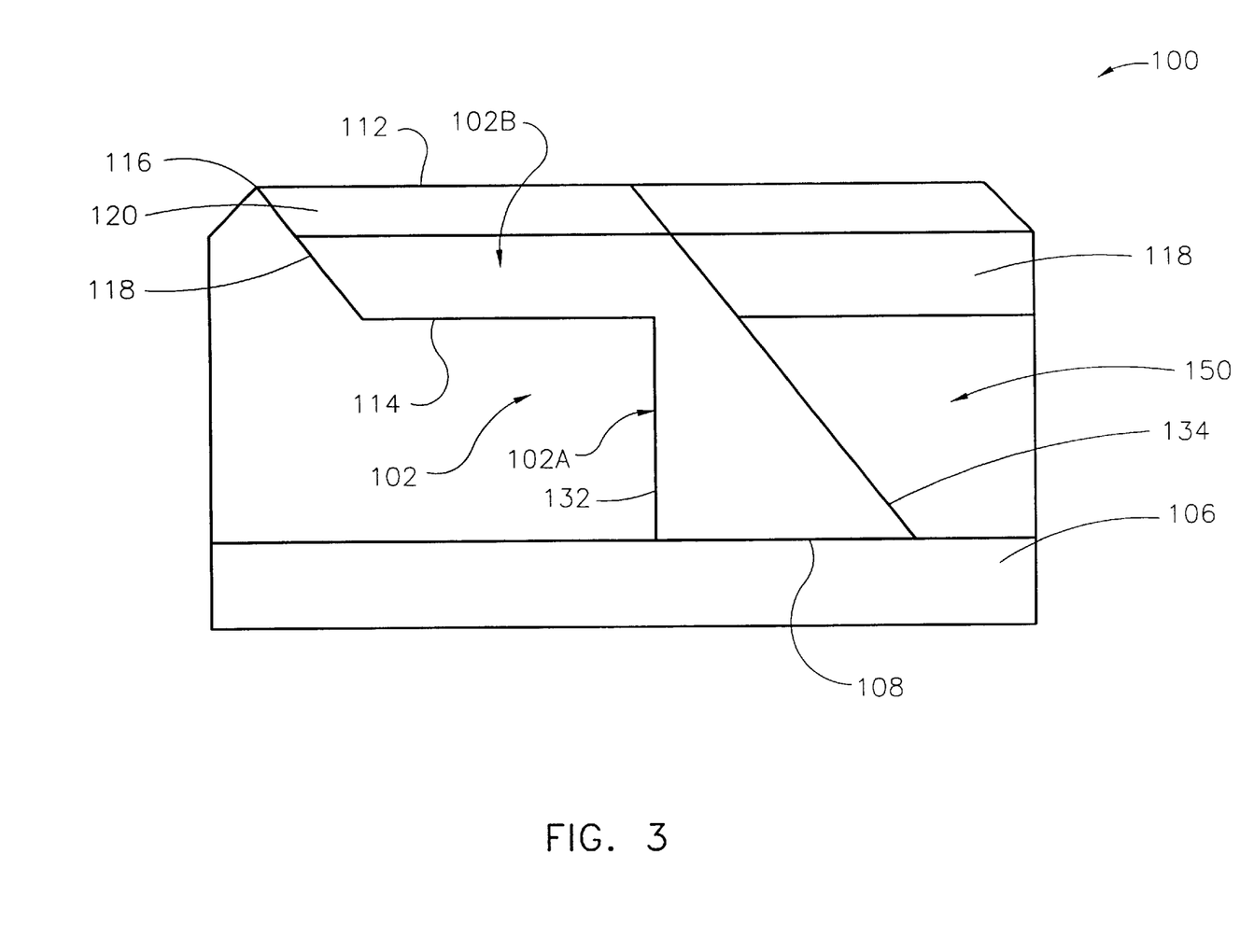
FIG. 3 is a side view of the rotor of FIG. 2.
Figure 4:
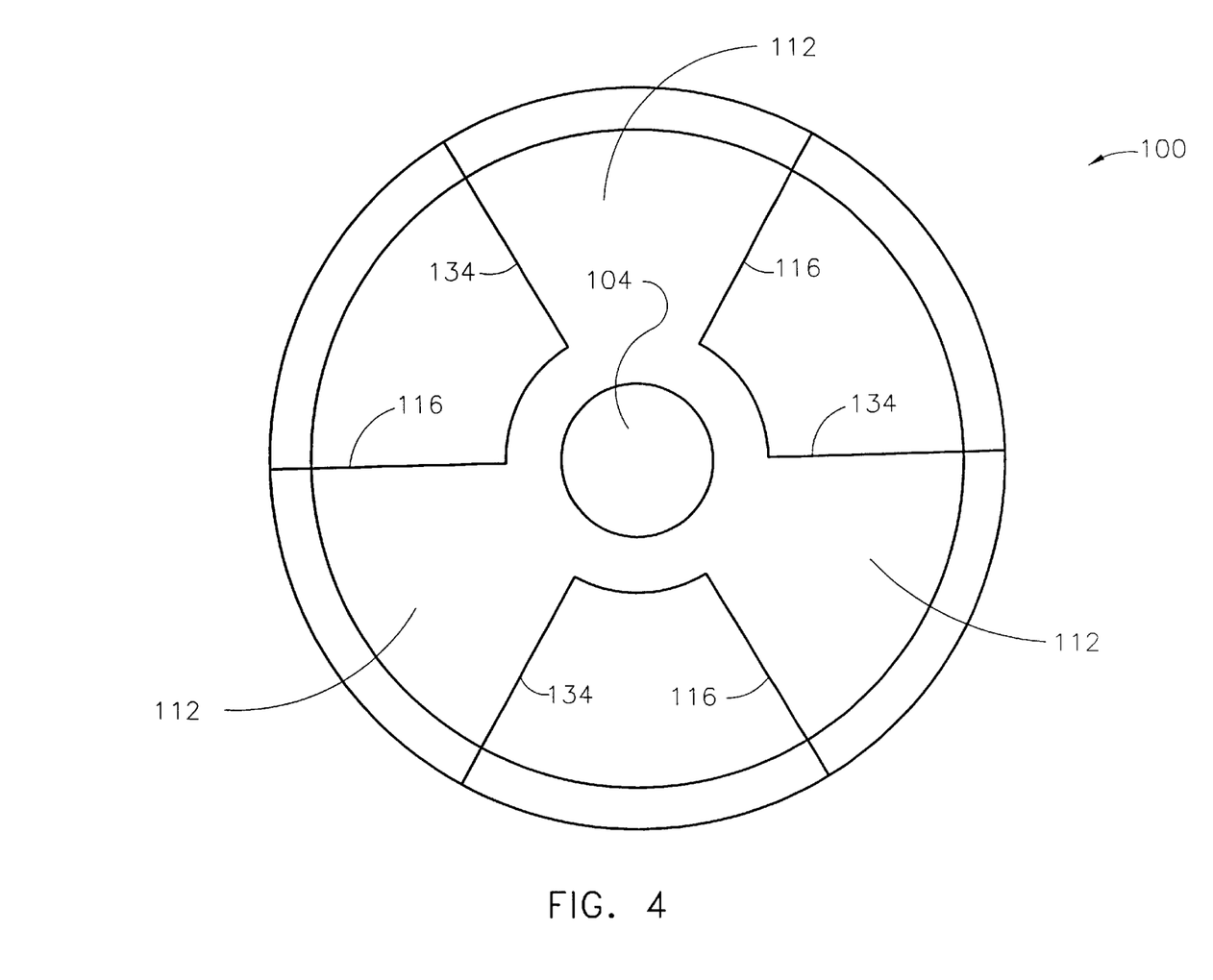
FIG. 4 is a top view of the rotor of FIG. 2.
Figure 5:
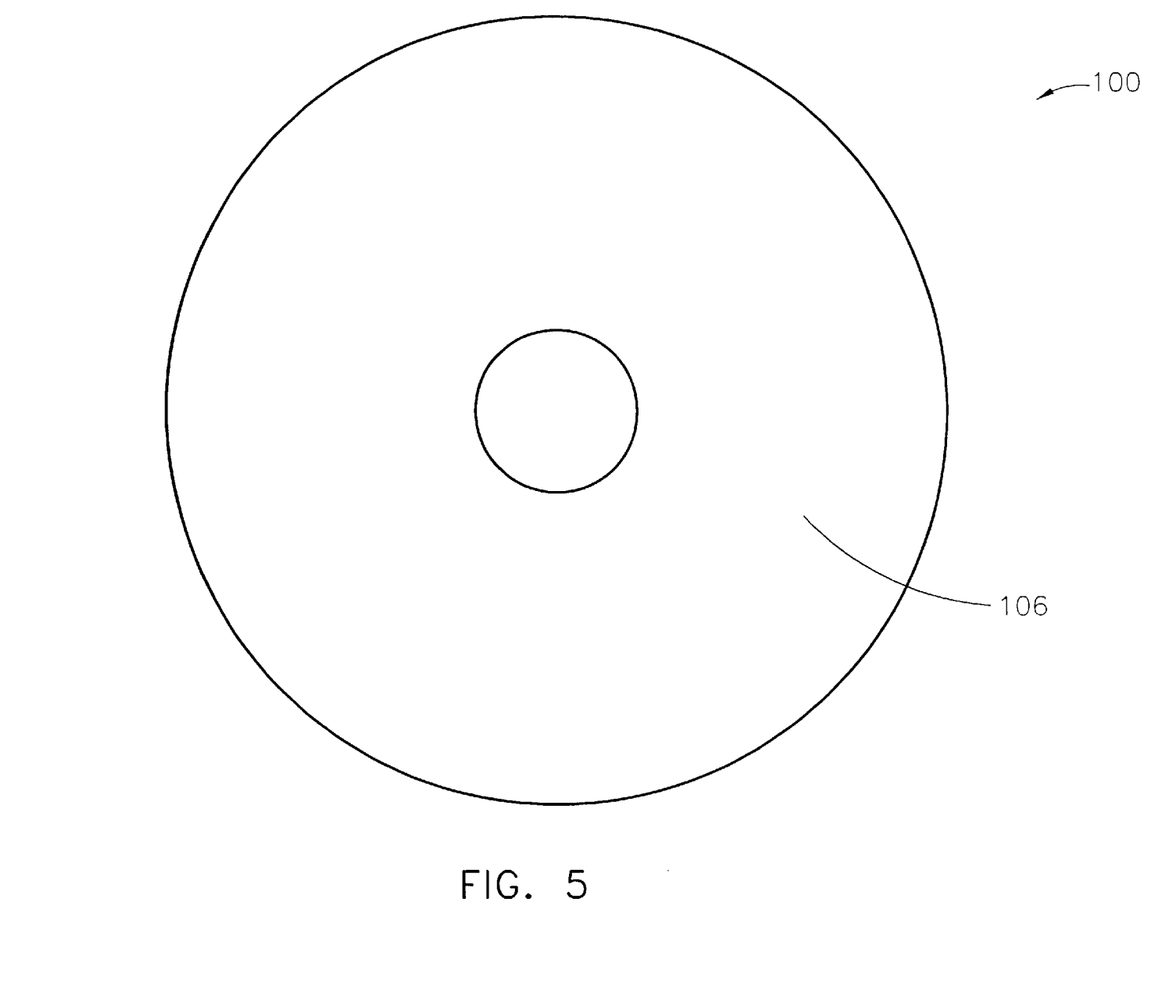
FIG. 5 is a bottom view of the rotor of FIG. 2.

Referring now to the figures, where the purpose is for describing a preferred embodiment of the invention and not for limiting same, FIG. 1 shows a pumping device 10 submerged in a metallic bath B. Device 10 has a superstructure 20 and a base (or casing) 50. Superstructure 20 is positioned outside of bath B when device 10 is operating and generally comprises a mounting plate 24 that supports a motor mount 26. A motor 28 is mounted to mount 26. Motor 28 is preferably electric or pneumatic although, as used herein, the term motor refers to any device capable of rotating a rotor.

Superstructure 20 is connected to base 50 by one or more support posts 30. Preferably posts 30 extend through openings (not shown) in plate 24 and are secured by post clamps 32, which are preferably bolted to the top surface (preferred) or lower surface of plate 24.

A rotor 100 is driven by a drive shaft 12 preferably comprised of a motor drive shaft connected to a rotor drive shaft 40. The motor drive shaft has a first end (not shown) and a second end 36, the first end being connected to motor 28. The preferred structure for connecting the motor drive shaft to rotor drive shaft 40 is a coupling 38. Coupling 38 has a first coupling member 90 attached to second end 36 of the motor drive shaft, and a second coupling member 180. A rotor shaft 40 has a first end 42 and a second end 44. First end 42 is connected to second end 36 of the motor shaft, preferably by coupling 38, by connecting first end 42 to second coupling member 180. The motor drive shaft drives coupling 38 which, in turn, drives rotor shaft 40. Preferably, coupling 38 and first end 42 of rotor shaft 40 are connected without the use of connecting threads.

Base 50, and all of the components of device 10 exposed to the molten metal, are preferably formed from graphite or other material suitable for use in molten metal. Base 50 includes a top surface 54 and an input port (or inlet) 56, preferably formed in top surface 54. Alternatively, an inlet could be formed in the bottom surface or pump 10 could be a dual-inlet pump with inlets in both top surface 54 and the bottom surface.

A pump chamber 58, which is in communication with port 56, is a cavity formed within housing 50. Chamber 58 is partially defined by a chamber wall 59. A discharge 60, shown in FIG. 1, is preferably formed tangentially with, and is in fluid communication with, pump chamber 58. Discharge 60 leads to an output port (or outlet) 62 formed in a side surface of housing 50. (Alternatively, the discharge may be formed in top surface 54 if the pump were a transfer pump.) Base 50 preferably includes a wear ring (or bearing ring) 64 that is preferably made of ceramic and is cemented to the lower edge of chamber 58.

The rotors of the present invention may be used with any type of molten metal pump. As shown in FIG. 1, rotor 100 is imperforate, formed of solid graphite, is mounted in a circulation pump, is attached to and driven by shaft 40 and is preferably placed centrally within chamber 58. Referring to FIGS. 2–5, rotor 100 preferably has three vanes 102. Rotor 100 may, however, have a perforate structure, have any number of vanes and be formed of any material suitable for use in a molten metal environment.

Rotor 100 further includes a connective portion 104, which is preferably a threaded bore, but can be any structure capable of drivingly engaging rotor shaft 40. It is most preferred that the outer surface of second 44 of shaft 40 have tapered threads and bore 104 be threaded to receive the tapered threads. A flow blocking plate 106 is preferably formed of ceramic and is cemented to the base 108 of rotor 100. In the embodiment shown, plate 106 preferably rides against circular bearing ring 64 in pump chamber 58 and blocks molten metal from entering or exiting through the bottom of chamber 58. Alternatively, plate 106 could be replaced by a plurality of individual bearing pins mounted in the rotor, or the bearing ring could be eliminated, in which case there would be openings between vanes 102 and wear ring 64 that would function as a second input port. In addition, the rotor could have a bearing surface integrally formed therein, such a bearing ring being either graphite or ceramic. Or, the bearing ring and/or bearing surface could be entirely eliminated, in which case the pump would preferably include a shaft or other device to keep the rotor centered in the pump housing.

Rotor 100 preferably rotates about a vertical axis Y and preferably includes three vanes 102. The preferred dimensions of rotor 100 will depend upon the size of the pump (because the size of the rotor varies with the size of the pump) and on manufacturer's specifications. The preferred proportions of rotor 100, however, are shown in FIGS. 2–5. A rotor according to the invention should have a structure that directs flow into the pump chamber and a structure that directs flow outward towards the pump chamber wall. Preferably this is accomplished by either (1) providing at least one vane on the rotor that both directs molten metal into the chamber and outward against the chamber wall, or (2) providing at least one vane that directs molten metal into the pump chamber, and at least one vane that directs molten metal outward against the chamber wall Preferably each vane 102 has the same configuration so only one vane 102 shall be described. Each vane 102 preferably includes a vertically-oriented portion 102A and a horizontally-extending portion 102B. The respective vertical and horizontal orientation of the portions described herein is in reference to a rotor positioned in a standard pump having an input port in its top surface. The invention, however, covers any rotor for use in a molten-metal pump, whether the input port is formed in the top surface, bottom surface or a side surface. It will be therefore understood that the terms "horizontal" and "vertical" refer to the rotor when it is in the orientation shown in FIGS. 1 and 2.

In the preferred embodiment, portion 102B (also called a projection or horizontally-extending projection) is positioned closer to inlet 56 than portion 102A. This is because the molten metal in bath B outside of inlet 56 should first be directed into chamber 58 before being directed outward towards chamber wall 59. Projection 102B has a top surface 112 preferably flush with inlet 56 and a bottom surface 114. (However, surface 112 and projection 102B may be outside or inside of inlet 56.) Projection 102B further includes a leading edge 116 and an angled surface (or first surface) 118, which is preferably formed in surface 114 adjacent to leading edge 116. As will be understood, surface 118 is angled (as used herein the term angled refers to both a substantially planar surface, or a curved surface, or a multi-faceted surface) such that, as rotor 100 turns (as shown it turns in a clockwise direction) surface 118 directs molten metal into pump chamber 54 (i.e., towards plate 106 in the embodiment shown). Any surface that functions to direct molten metal into chamber 54 can be used, but it is preferred that surface 118 is substantially planar and formed at a 30°–60°, and most preferably, a 45° angle. Projection 102B also preferably includes a lip 120. Lip 120 prevents too thin an edge from being formed when surface 118 is cut into projection 102B. This reduces the likelihood of breakage during shipping or handling of rotor 100, but is not related to the overall function of rotor 100 during operation of pump 10. Lip 120 also serves to help align and center rotor 100 within chamber 58 during installation.

Portion 102A, which is preferably vertical (but can be angled or curved), extends from the back (or trailing portion) of projection 102B to base 108. Portion 102A has a leading face (or second surface) 132 and a trailing face 134. Leading face 132 is preferably planar and vertical, although it can be of any configuration that directs molten metal outward against the wall of chamber 54.

A recess 150 is formed in top surface 112 and preferably extends from top surface 112 to trailing face 134. As shown, recess 150 begins at a position on surface 112 slightly forward of face 132 and terminates at a position on face 134. The purpose of recess 150 is to reduce the area of top surface 112, thereby creating a larger opening at inlet 56 when rotor 100 is positioned in pump chamber 58. This allows more molten metal to enter pump chamber 58 for given time period thus enabling rotor 100 and pump 10 to move more molten metal per rotor revolution. Because pump 10 including rotor 100 can pump more metal per revolution of rotor 100, pump 10 can, if desired, be operated at lower speeds. This decreases vibration and leads to longer life of the pump components. Therefore, if operated at a lower speed, pump 10 can achieve the same results as other molten metal pumps while requiring less maintenance, which saves money in parts, labor and reduced down time. Alternatively, pump 10 can be operated at the same speed as molten metal pumps utilizing conventional rotors, in which case it will generate a greater flow than such molten metal pumps.

Figure 6:
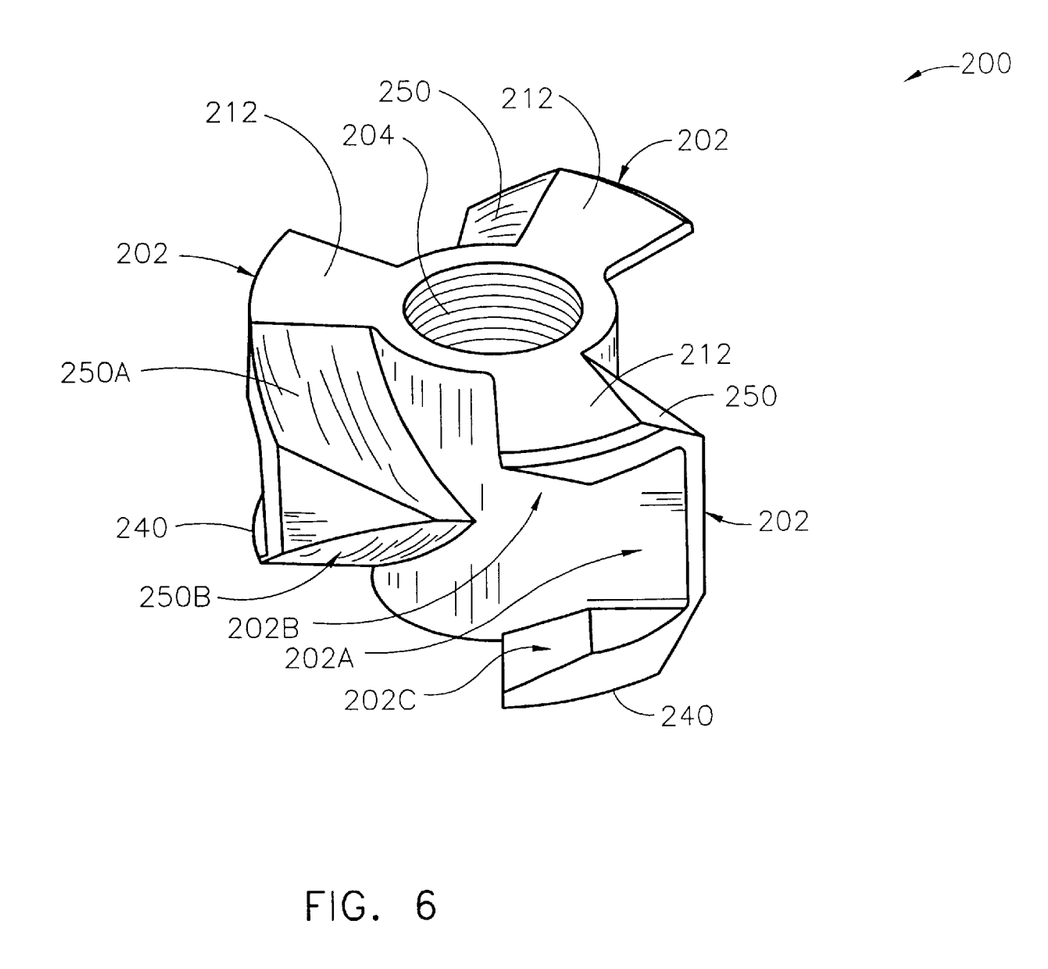
FIG. 6 is a perspective view of a dual-flow rotor according to the invention for use in a pump having an inlet in the top surface of the pump base and an inlet in the bottom surface of the pump base.
Figure 6A:
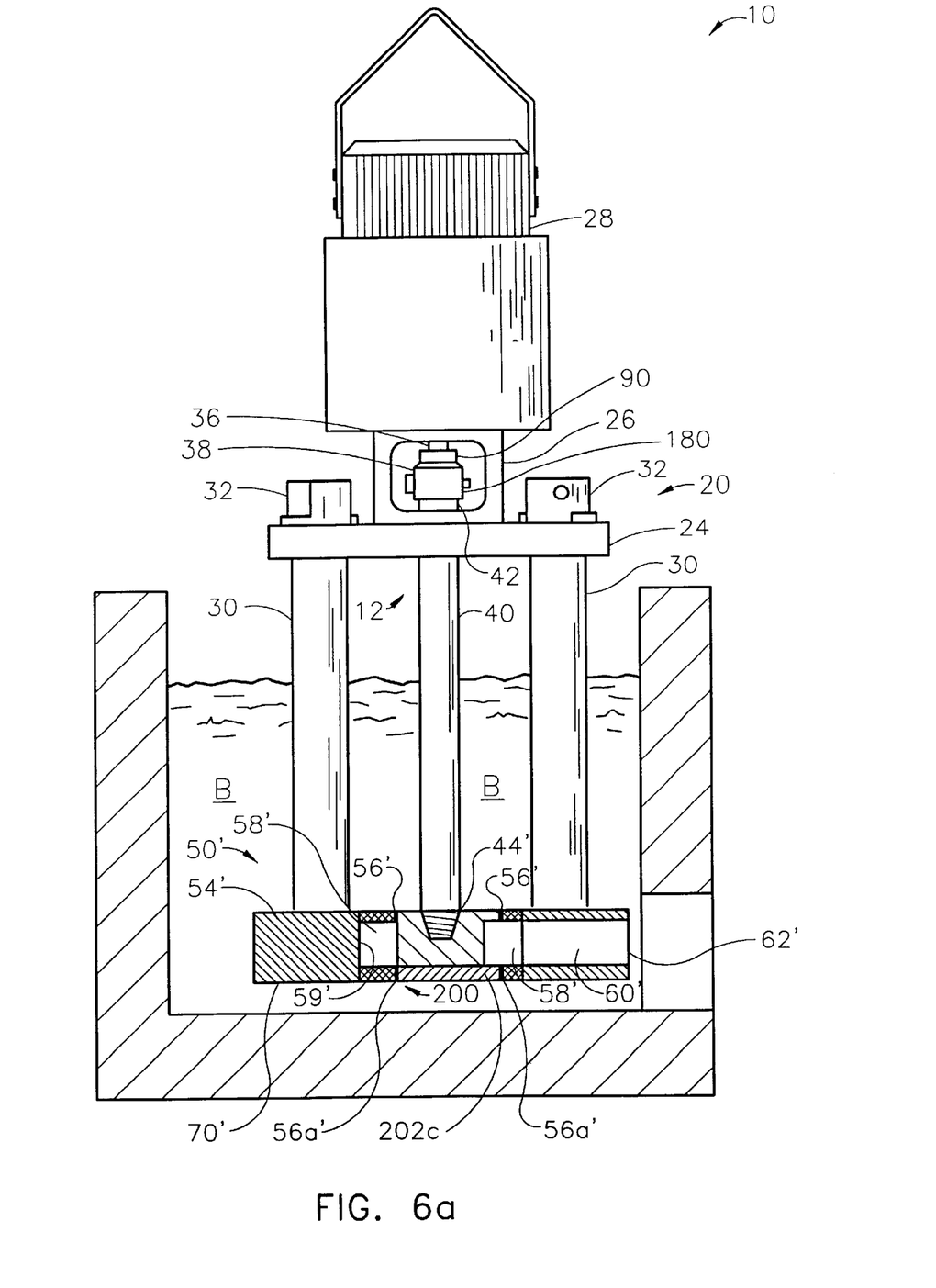
FIG. 6a is a front, partial cross-sectional view of a pump that includes two inlets, one in the top surface of the pump base and one in the bottom surface of the pump base, and that includes the rotor of FIG. 6.

FIG. 6 shows a rotor 200 according to the invention for use in a pump having two inlets, one in the bottom surface of the pump base and one in the top surface of the pump base. Such an arrangement is shown in FIG. 6a. Pump 10' is the same as previously described pump 10 except that it includes a pump base 50' having dual inlets 56' and 56a'. Inlet 56' is formed in top surface 54' and inlet 56a' is formed in bottom surface 70'. Base 50' further includes a pump chamber 58' having a chamber wall 59'. As shown, pump 10' is a circulation pump having a tangential discharge 60' leading to an outlet 62'. Pimp 10' could also be a transfer pump, having an outlet formed in top surface 54', or it could include a gas-release device. Rotor 200 is shown connected to end 44 of shaft 40 and positioned in chamber 58'.

Rotor 200 preferably has three vanes 202. Each vane preferably has the same configuration so only one vane 202 will be described in detail. Portion 202A is preferably positioned generally in the center of rotor 200 and is configured to push molten metal outward towards wall 59' of pump chamber 58'. Portion 202B is positioned next to top inlet 56' and is configured to direct molten metal into pump chamber 58', towards portion 202A. Portion 202C is positioned next to inlet 56a' in the bottom surface 70' and is configured to direct molten metal into pump chamber 58', towards portion 202A.

A recess 250A is formed in the top surface 212 of each vane 202, and a recess 250B is formed in the bottom surface 240 of each vane 202. The purpose of recesses 250a and 250b is to allow more molten metal, over a given time period, to enter chamber 58' through inlet 56' and/or inlet 56a'.

Figure 7:
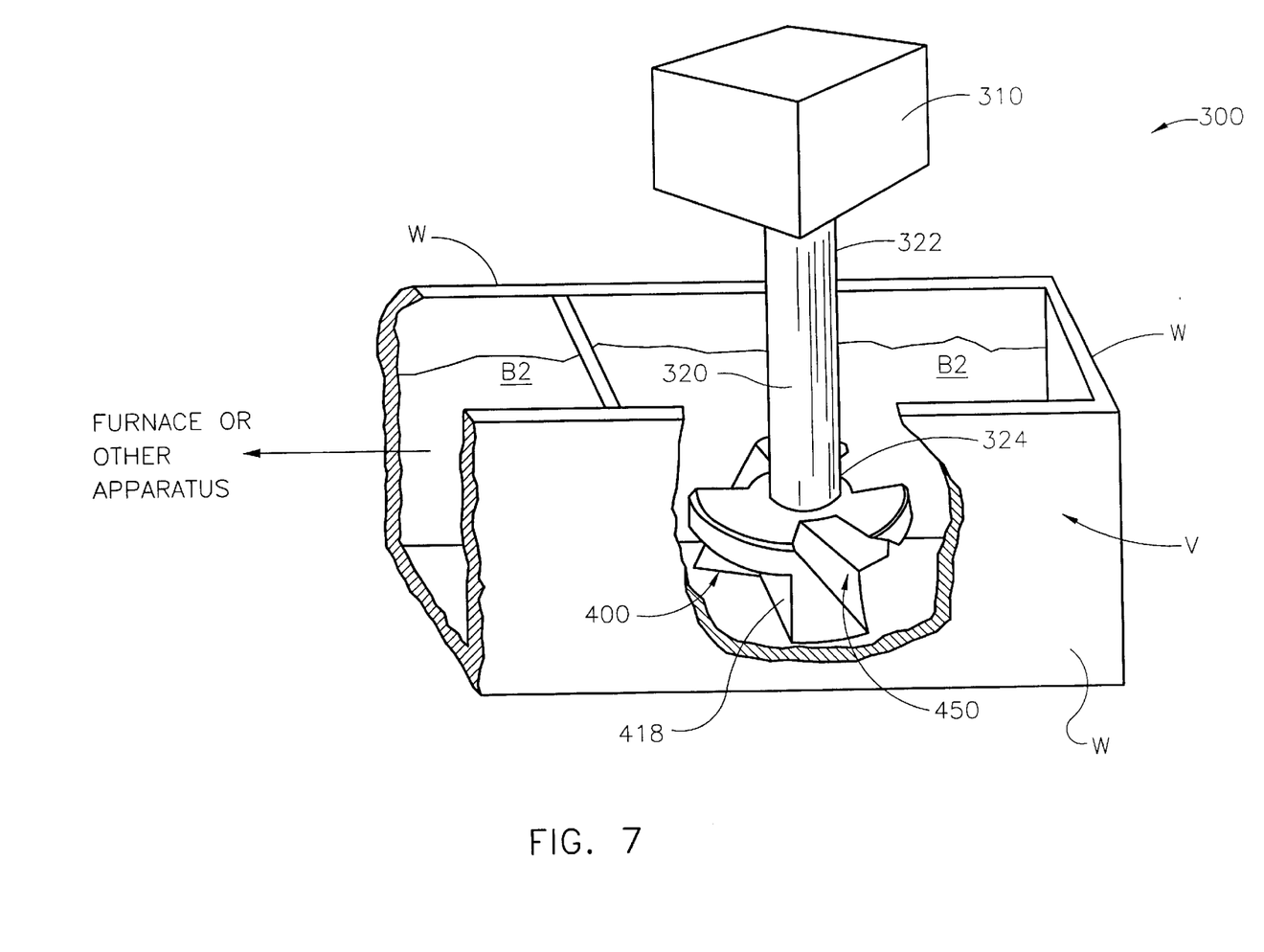
FIG. 7 is a cut-away view of a well containing molten metal with a perspective view of a scrap melter according to the invention.
Figure 8:
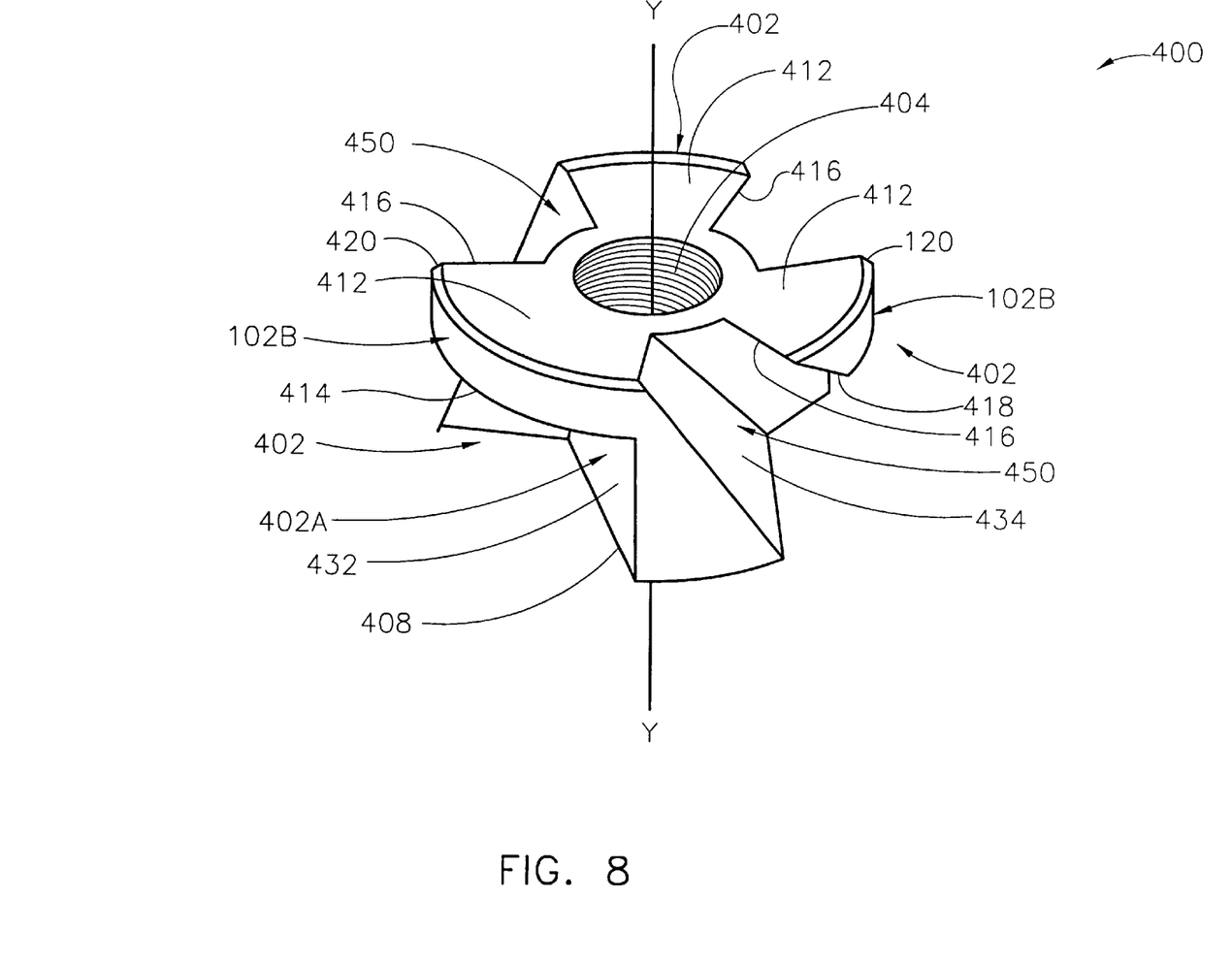
FIG. 8 is a perspective view of the rotor shown in FIG. 7.

FIG. 7 shows a scrap melter 300 including a rotor 400 of the present invention. Scrap melter 300 includes a drive source 310, a drive shaft 320, having a first end 322, and a second end 324. Rotor 400 is identical to previously described dual-flow rotor 100, except that rotor 400 does not include a flow-blocking plate such as plate 106. Drive source 310 is any device or combination of devices capable of rotating shaft 320 and rotor 400. First end 322 of shaft 320 is connected to drive source 310 and second end 324 is connected to connective portion 404 of rotor 400. Additional details about scrap melter 300 are disclosed in U.S. Pat. No. 5,308,045, the disclosure of which is incorporated herein by reference.

In operation, rotor 400 is immersed in molten metal bath B2 contained within a vessel V having one or more vessel walls W. Second end 324 of shaft 320 is below the surface of bath B2, and first end 322 of shaft 320 is above the surface of bath B2. Drive source 310 is positioned above bath B2 and is suspended by a suspending device (not shown). As drive source 310 rotates shaft 320, rotor 400 also rotates. Surface 418 of portion 402B pushes the molten metal downward into bath B while face 432 of portion 402A directs the molten metal outward towards the vessel wall(s). Molten metal from above the impeller is thereby drawn downward. Materials in the form of unmelted metal scrap and other material from the surface of bath B2 are drawn downward and circulated in bath B2. Impeller 400 provides the advantage of driving the molten metal downward thereby creating a downward draw to submerge scrap. Further, impeller 400 can displace a greater amount of molten metal per revolution. Therefore, it can either be used to (1) create a greater flow, or (2) be run at lower speeds, at which it will generate the same flow as conventional rotors, but will vibrate less. Less vibration leads to longer component life and less maintenance.

Preferred embodiments having now been described, modifications that do not depart from the spirit of the invention will become apparent to those skilled in the art. The invention is thus not limited to the preferred embodiment, but is instead set forth in the following claims and legal equivalents thereof.

What is claimed is:

1. A device for pumping molten metal, the device comprising:
   (a) a superstructure;
   (b) a motor positioned on the superstructure;
   (c) a drive shaft having a first end and a second end, the first end being connected to the motor;
   (d) a pump base having an input port, a pump chamber, a chamber wall and a discharge leading to an output port; and (e) a rotor connected to the second end of the drive shaft, the rotor positioned in said pump chamber and having a vane including:
  (i) a first surface for moving molten metal into the pump chamber, the first surface being angled;
  (ii) a second surface for moving molten metal towards the chamber wall, the second surface being positioned farther from the inlet than the first surface.

2. The device of claim 1 wherein the pump base includes a top surface and the output port is in the top surface, the device further including a metal-transfer conduit extending from said output port to the superstructure, and a clamp on the superstructure for securing the metal-transfer conduit.

3. The device of claim 1 wherein the pump base includes a side surface and the output port is in the side surface, the device further including a gas-release device for releasing gas into a stream of molten metal generated by the device.

4. The device of claim 3 wherein the gas-release device is connected to the discharge for the release of gas therein.

5. The device of claim 3 which further includes a metal-transfer conduit extending from the discharge, the gas-release device being connected to the metal-transfer conduit for the release of gas therein.

6. The device of claim 1 which includes a gas-release device for releasing gas directly into the pump chamber.

7. A device for pumping molten metal, the device comprising:
  (a) a superstructure;
  (b) a motor positioned on the superstructure;
  (c) a drive shaft having a first end and a second end, the first end being connected to the motor;
  (d) a pump base having an input port, a pump chamber, a chamber wall and a discharge leading to an output port; and
  (e) a rotor connected to the second end of the drive shaft, the rotor positioned in said pump chamber and having a vane including:
    (i) a first surface for moving molten metal into the pump chamber, the first surface being angled; and
    (ii) a second surface for moving molten metal towards the chamber wall, the second surface being positioned farther from the inlet than the first surface,
  wherein the rotor includes a horizontally-extending projection, the projection including a leading edge, a top surface and a bottom surface, the first surface being formed on the bottom surface of the projection.

8. The device of claim 7 wherein the projection has a width and a height and the second surface has a height, the height of the projection being no more than ½ the height of the second surface.

9. The device of claim 7 wherein the second surface is the leading face of a vertical portion of the vane, the vertical portion having a width and including a trailing face, a recess being formed on the vane, the recess extending from the top surface of the projection to the trailing face of the vertical portion.

10. The device of claim 9 wherein the width of the vertical portion is no greater than ½ the width of the projection.

11. The device of claim 9 wherein the recess begins on the upper surface at a position forward of the second surface.

12. The device of claim 9 wherein the recess terminates on the trailing face of the vertical portion at a position one-third the height of the vertical portion.

13. The device of claim 9 wherein the recess is formed at a 30°–60° angle.

14. The device of claim 7 wherein the top surface is flush with the inlet.

15. The device of claim 1 wherein the second surface of the rotor is vertical.

16. The device of claim 7 wherein the bottom surface of the projection further comprises a horizontal surface between the first surface and the second surface.

17. The device of claim 1 wherein the rotor vane is comprised of graphite.

18. The device of claim 1 wherein the rotor is imperforate.

19. A device for pumping molten metal, the device comprising:
  (a) a superstructure;
  (b) a motor positioned on the superstructure;
  (c) a drive shaft having a first end and a second end, the first end being connected to the motor;
  (d) a pump base having an input port, a pump chamber, a chamber wall and a discharge leading to an output port; and
  (e) a rotor connected to the second end of the drive shaft, the rotor positioned in said pump chamber and having a vane including:
    (i) a first surface for moving molten metal into the pump chamber, the first surface being angled; and
    (ii) a second surface for moving molten metal towards the chamber wall, the second surface being positioned farther from the inlet than the first surface,
  wherein the rotor includes three vanes.

20. The device of claim 1 wherein the device is a circulation pump.

21. A dual-flow rotor for directing molten metal into and out of a pump chamber, the rotor including a rotor vane comprising:
  (a) a first means for moving molten metal into the pump chamber; and
  (b) a second means for moving molten metal towards the chamber wall.

22. The rotor of claim 21 wherein:
  (a) the first means for moving molten metal into the pump chamber is an angled surface; and
  (b) the second means for moving molten metal towards the chamber wall is a second surface beneath said angled surface.

23. The rotor of claim 22 wherein said second surface is vertical.

24. The rotor of claim 21 wherein the vane further comprises a top surface and a recess means on the top surface to allow molten metal to enter a pump chamber.

25. A dual flow rotor for use in a molten metal pump having a pump chamber and a chamber wall, the rotor comprising:
  (a) a first means for moving molten metal into the pump chamber;
  (b) a second means for moving molten metal into the pump chamber; and
  (c) a third means for moving molten metal towards the chamber wall, the third means positioned between the first means and the second means.

26. The device according to claim 19, wherein the rotor is imperforate.

27. The device according to claim 19, further comprising a gas-release device for releasing gas directly into the pump chamber.

28. The device according to claim 19, wherein the rotor further comprises a recess in a top surface of said rotor between each of said three vanes.

29. The device according to claim 28, wherein the top surface of said rotor is flush with an inlet of said pump chamber.

30. A dual flow rotor for use in a molten metal pump having a pump chamber and a chamber wall, the rotor comprising:
   at least three vanes, each vane including first means for forcing molten metal into the pump chamber and second means for forcing molten metal towards the chamber wall.

31. A scrap melter to be used in a vessel having a vessel wall and containing a molten metal bath, the scrap melter comprising:
   a motor;
   a shaft having a first end connected to the motor and a second end; and
   a rotor attached to the second end of said shaft, the rotor comprising at least three vanes, wherein each vane comprises first means for pushing molten metal into the molten metal bath, and second means for pushing molten metal toward the vessel wall.

32. The scrap melter according to claim 31, further comprising recess means formed in a top surface of said rotor between said at least three vanes, said recess means for allowing molten metal to pass the top surface of the rotor to encounter the at least three vanes.

* * * * *